(12) United States Patent
Rosenberger et al.

(10) Patent No.: US 7,354,877 B2
(45) Date of Patent: Apr. 8, 2008

(54) CARBON NANOTUBE FABRICS

(75) Inventors: Brian T. Rosenberger, Aledo, TX (US); William M. Carra, Ft. Worth, TX (US)

(73) Assignee: Lockheed Martin Corporation, Bethesda, MD (US)

( * ) Notice: Subject to any disclaimer, the term of this patent is extended or adjusted under 35 U.S.C. 154(b) by 0 days.

(21) Appl. No.: 10/696,631

(22) Filed: Oct. 29, 2003

(65) Prior Publication Data

US 2005/0095938 A1 May 5, 2005

(51) Int. Cl.
*D03D 15/00* (2006.01)
(52) U.S. Cl. .............. 442/194; 442/189; 442/239; 442/243; 442/301; 442/302; 997/742; 997/750; 997/752
(58) Field of Classification Search .......... 442/189, 442/194, 239, 243, 301, 302; 997/742, 750, 997/752
See application file for complete search history.

(56) References Cited

U.S. PATENT DOCUMENTS

| | | | |
|---|---|---|---|
| 5,736,474 A | 4/1998 | Thomas | 442/388 |
| 5,788,907 A | 8/1998 | Brown, Jr. et al. | 264/280 |
| 5,804,757 A | 9/1998 | Wynne | 89/36.05 |
| 6,126,888 A * | 10/2000 | Goldstein | 264/610 |
| 6,265,466 B1 * | 7/2001 | Glatkowski et al. | 523/137 |
| 6,280,677 B1 * | 8/2001 | Yakobson | 264/430 |
| 6,299,812 B1 * | 10/2001 | Newman et al. | 264/176.1 |
| 6,682,677 B2 * | 1/2004 | Lobovsky et al. | 264/172.11 |
| 2002/0053801 A1 * | 5/2002 | Herman | 290/1 R |
| 2003/0102585 A1 | 6/2003 | Poulin et al. | 264/11 |
| 2004/0053780 A1 | 3/2004 | Jiang et al. | 502/182 |

FOREIGN PATENT DOCUMENTS

WO  02/055769 A1  7/2002
WO  03/004741 A1  1/2003

OTHER PUBLICATIONS

"*Nanotech Gets in your Pants, and Soon, Your Plane*", The Associated Press, Sep. 10, 2001, 4 pages.
"*Textile Labelling-General Worksheet Glossary*", Fair Business Practices Branch, Government of Canada, Aug. 15, 2001, 13 pages.
"*Independent Research and Technology*", BTTG, United Kingdom, printed Sep. 5, 2001, 1 page.
"*Weaving*", Encyclopaedia Britannica, printed Sep. 5, 2002, 1 page.
Kaili Jiang, et al.; Spinning Continuous Carbon Nanotube Yarns; Nature, vol. 419, Oct. 24, 2002, 1 p.

* cited by examiner

*Primary Examiner*—Andrew T. Piziali
(74) *Attorney, Agent, or Firm*—Bracewell & Giuliani LLP

(57) ABSTRACT

The present invention provides fabrics that have unique chemical, electrical, and thermal properties. The fabrics comprise layers of yarns woven together wherein the yarns further comprise carbon nanotube fibers. These carbon nanotube fibers may be either single-walled or multi-walled carbon nanotubes. The use of carbon nanotube fibers allows the fabrics to insulate, semi-conduct or super-conduct electrical charges. Additionally, the thermal properties of carbon nanotubes allow thermal energy to flow efficiently between the fabric and a heat sink or source. Additional yarns of materials other than carbon nanotubes can be integrated or woven into the fabric to provide other unique properties for the fabric. These fabrics can be layered to form unique garments or structures.

10 Claims, 8 Drawing Sheets

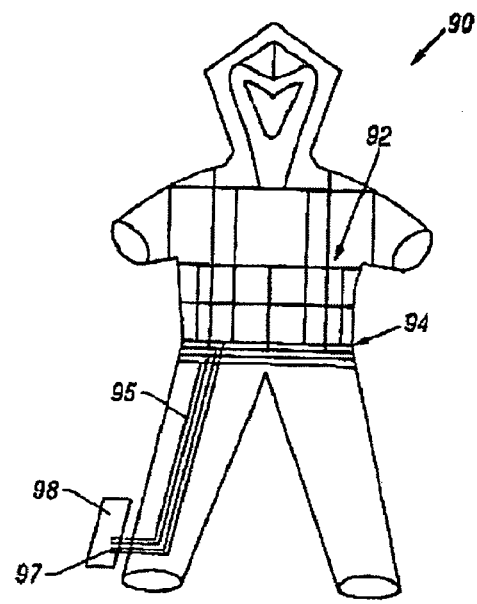
FIG. 7
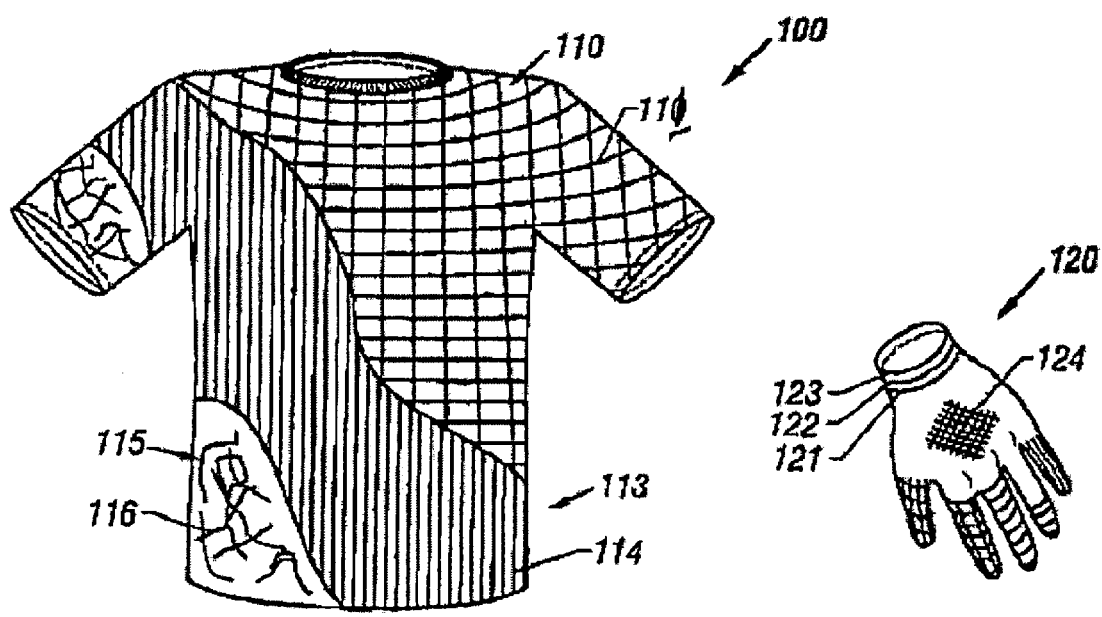
FIG. 8A  FIG. 8B

CARBON NANOTUBE FABRICS

TECHNICAL FIELD OF THE INVENTION

The present invention generally relates to material structures that form fabrics. More particularly, this invention relates to fabrics woven from yarns that comprise carbon nanotube fibers.

BACKGROUND OF THE INVENTION

Weaving yarns of fibers may produce fabrics. The fabric's properties depend on the properties of the fibers. Illustratively, wool fibers are used to keep a person warm in the winter; asbestos fibers are used as a flame retardant, steel fiber are used for strength whereas gold fibers are used for conducting electricity.

Combining fibers does not always result in a fabric that possesses a useful set of properties for a range of applications. For example, anti-ballistic fibers, such as Kevlar, are sensitive to heat. Although adding flame retardant fibers of asbestos may provide limited support, Kevlar fabrics would not work optimally if exposed to continuous heat as well as to ballistic projectiles. Ideally, compatible fibers having unique mechanical, thermal, electrical and optical properties would be woven into fabrics that demonstrate all the desired properties within the fabric.

In addition to the limited range of applications, fabric quality depends on the ability to interweave yarns with one another. The material structure and size of the fibers and resulting yarns may inhibit the range of application of a certain fabric. Illustratively, fabrics that block entry of pathenogenic biological materials require that the consistent yarns be interwoven tightly to prevent any gaps between one another. The thickness of individual fibers alone could allow significant gaps within each yarn defined by those fibers. Generally, there does not exist a nanoscale fiber ($1 \times 10^{-9}$ meters) that provides significant strength and ductility so as to define a fabric.

SUMMARY OF THE INVENTION

The present invention weaves carbon nanotubes into fabrics that may be applied to a wide range of uses. In general, the structural arrangement of the fabric exhibits the mechanical, thermal, electrical, physical and chemical properties associated with carbon nanotubes.

Carbon nanotubes consist of two-dimensional hexagonal sheets folded together and often capped at both ends by a fullerene cap. Because of its tubular shape, a carbon nanotube extends outwardly to form a strand having a length many times greater than its diameter. Generally, the strands or "fibers" can be grouped together to define yarns. These yarns are then interwoven with one another and/or with companion yarns so as to define a fabric structure arrangement.

Carbon nanotubes are a type of fullerene that exhibit mechanical strength and strain characteristics greater than steel and other alloys but exhibit low-density characteristics similar to or below that of ceramic or polymer composites. As such, carbon nanotubes exhibit anti-ballistic characteristics. Carbon nanotubes also exhibit electrical characteristics, dependent on their lattice structure. These characteristics include insulating, semiconducting, conducting, and super conducting properties, among others. Carbon nanotubes also demonstrate unique thermal characteristics.

Carbon nanotubes with differing characteristics can be woven together to create unique fabrics. For example, carbon nanotubes that serve to electrically insulate can be combined or layered with highly electrically conductive carbon nanotubes to create garments that shield and protect the wearer from electric shock. Similarly, thermally conductive carbon nanotubes can be woven into materials that when tethered to a heat sink or source, serve to protect a user from intense thermal environments.

Other aspects, advantages, and novel features of the present invention will become apparent from the detailed description of the invention when considered in conjunction with the accompanying drawings.

BRIEF DESCRIPTION OF THE DRAWINGS

For a more complete understanding of the present invention and advantages thereof, reference is now made to the following description which is to be taken in conjunction with the accompanying drawings, and which like reference numerals indicate like features and, wherein:

FIG. 7 depicts a full body tethered garment made of fabric woven from carbon nanotube fibers;

FIGS. 8A and 8B depict various garments made from fabrics woven from carbon nanotubes; FIG. 8A shows a Faraday vest; FIG. 8B shows one exemplary embodiment of a Faraday glove;

FIG. 10A depicts a golf club made from these fabrics; FIG. 10B depicts a tennis racket; FIG. 10C depicts an inflatable craft formed from these fabrics.

DETAILED DESCRIPTION OF THE INVENTION

Detailed embodiments of the present invention are disclosed herein. However, it is to be understood that the disclosed embodiments are merely exemplary of the invention, which may be embodied in various forms.

The present invention provides fabrics that have unique chemical, electrical, and thermal properties. The fabrics comprise layers of yarns woven together wherein the yarns further comprise carbon nanotube fibers. These carbon nanotube fibers may be either single-walled or multi-walled carbon nanotubes. The use of carbon nanotube fibers allows the fabrics to insulate, semi-conduct or super-conduct electrical charges. Additionally, the thermal properties of carbon nanotubes allow thermal energy to flow efficiently between the fabric and a heat sink or source. Additional yarns of materials other than carbon nanotubes can be integrated or woven into the fabric to provide other unique properties for the fabric. These fabrics can be layered to form unique garments or structures.

Figure 1:
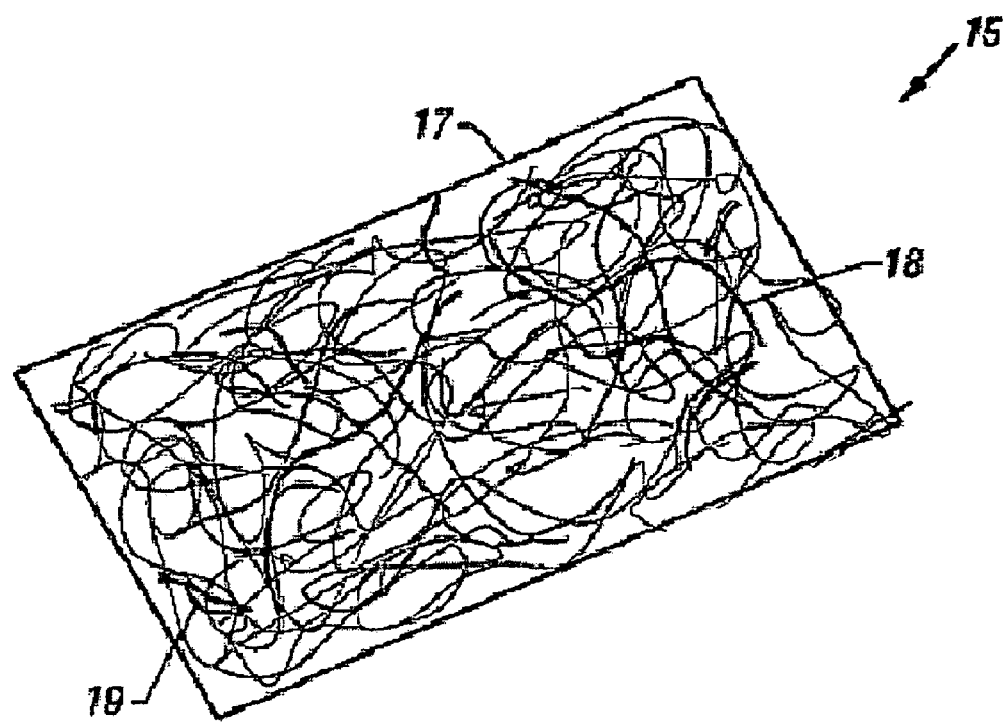
FIG. 1 is a schematic diagram illustrating a network of fibers comprising carbon nanotubes.

FIG. 1 illustrates a non-woven fabric 15, comprising yarns 17. Twisted fibers, such as carbon nanotubes, form yarns 17. These fibers exhibit unique electrical and mechanical properties of carbon nanotubes woven together along the nanotube's longitudinal axis. Long nanotubes can create macroscopic nanotube structures that maintain the unique properties of the nanotube. Although it remains difficult to infinitely increase the length of nanotubes by growth, an alternative method exists to obtain nanotube yarns of any desired length, which allow the properties of carbon nanotubes to be realized at a macroscopic level. One such method draws a continuous yarn of nanotubes from an array of nanotubes several hundred microns high on a silicon substrate.

In one embodiment, continuous yarns or fibers are drawn from superaligned arrays of parallel nanotubes held together by van der Waals forces. The yarns begin as thin ribbons a few hundred microns wide that contain parallel threads with diameters of several hundred nanometers.

When heat or electric current is applied to yarns formed from such fibers, increased conductivity and tensile strength has been observed. This indicates that some welding occurred at the connection points between the tubes. These carbon nanotube yarns, after proper heat treatment, may be woven into a variety of macroscopic objects.

Two other existing methods of making thread from nanotubes. These methods involve suspending nanotubes in liquid and inducing a current to align the nanotubes, or using a flow of hydrogen gas to align nanotubes as they form in a vapor of carbon atoms. However, it should be noted that any known method of generating the carbon nanotube fibers might be used.

Nanotube arrays contain millions of separate carbon nanotubes. Nanotubes within the arrays are typically 1–10 nanometers in diameter and up to several hundred microns long. The tubes may be either single walled or multi walled, meaning each contains several layers of carbon atoms rolled up into successively smaller tubes. The nanotubes are held together along their length due to van der Waals forces. The thickness of the yarn may be varied dependent on the tools or methods used to pull the nanotube fibers. Heating the yarn strengthens the junctions between nanotubes, increasing their tensile strength and conductivity. It should be noted that the present invention might be applied to fabrics formed from yarns and fibers of nanotubes other than carbon.

Returning to FIG. 1, Fabric 15 includes fibers 18 made of carbon nanotubes. These fibers 18 may include both single-walled carbon nanotubes or multi-walled carbon nanotubes. Fibers 18 may serve as electrical or thermal insulators, electrical or thermal conductors, or as highly conductive carbon nanotubes. In this disclosure and appended claims, the term "highly conducting" refers to the ability to conduct electricity with substantially superconducting characteristics.

Yarns 17 may further include other compatible yarns 19. Compatible yarns are comprised of fibers other than carbon nanotubes. For example, compatible yarns may include polymers, ceramic yarns, metallic yarns and yarns having electrical properties such as semiconducting or highly conducting yarns. The compatible yarn may comprise a "blend" of such fibers.

FIG. 1 depicts a random mixture of carbon nanotube fibers and other compatible yarns. One of ordinary skill in the art will readily recognize that the yarns defined of carbon nanotubes and at least one companion yarn may be woven in an orderly fashion. Moreover, the yarns formed from carbon nanotube fibers may also include fibers from materials other than carbon nanotubes.

Fabric 15 may exhibit electrically insulating characteristics due to the random nature of yarns. However, the random nature of yarns 17 may be employed against a wide range of impact angles from a ballistic element onto the fabric 15. For example, such cloth may be applied toward an anti-ballistic garment or vest.

Figure 2:
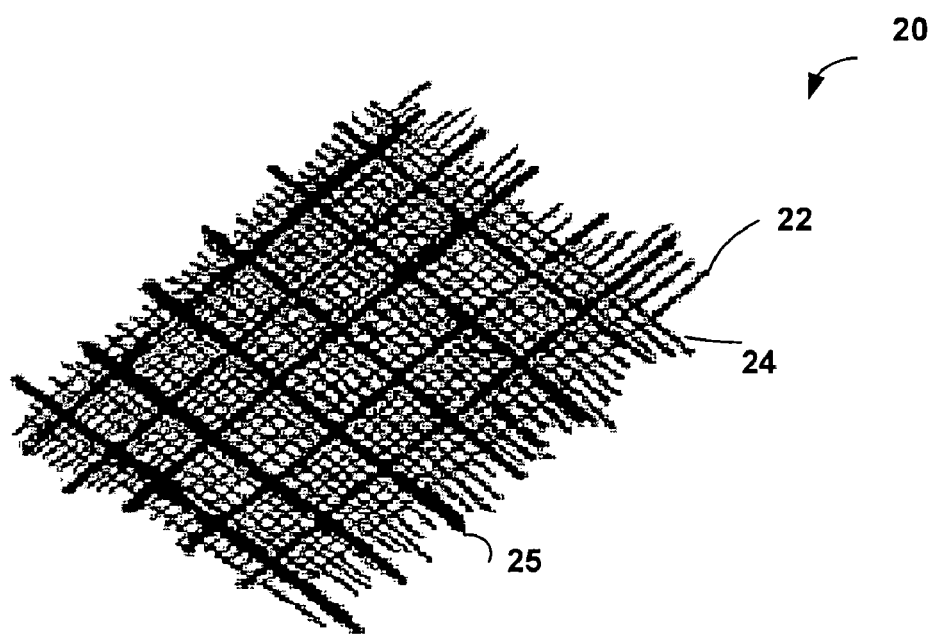
FIG. 2 provides a diagram illustrating another fabric woven from fibers comprising carbon nanotubes.

FIG. 2 depicts a woven fabric 20 comprising yarns 22 and 24. Yarns 22 and 24 include carbon nanotubes. Yarns 22 and 24 exhibit an orderly arrangement, such as a grid. In some embodiments high strength yarns 25 function as rip stops.

Yarns 17 may further include other compatible yarns 19. Compatible yarns are comprised of fibers other than carbon nanotubes. For example, compatible yarns may include polymers, ceramic yarns, metallic yarns and yarns having electrical properties such as semiconducting or highly conducting yarns. The compatible yarn may comprise a "blend" of such fibers.

FIG. 2 may combine a random mixture of carbon nanotube fibers and other compatible yarns. One of ordinary skill in the art will readily recognize that the yarns defined of carbon nanotubes and at least one companion yarn may be woven in an orderly fashion. Moreover, the yarns formed from carbon nanotube fibers may also include fibers from materials other than carbon nanotubes. Furthermore, FIG. 2 depicts "ripstop" material with periodically spaced carbon nanotubes.

Figure 3:
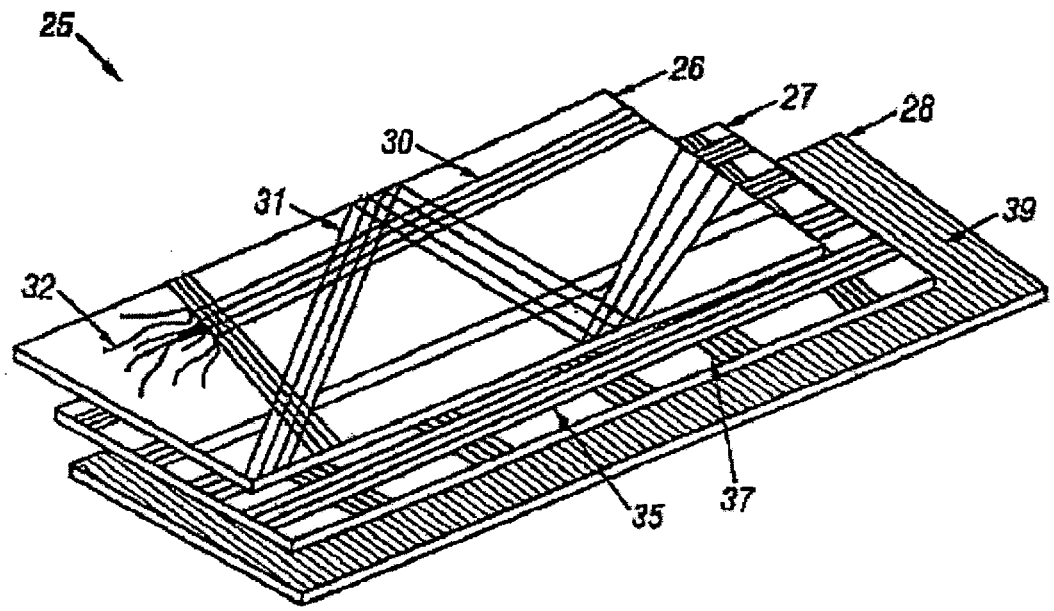
FIG. 3 illustrates layered fabric woven from fibers comprising carbon nanotubes with varying properties.

FIG. 3 (woven) illustrates a multilayered fabric 25. Fabric 25 comprises a series of individual woven fabric layers 26, 27 and 28. Layer 26 may include carbon nanotube fibers or yarns 30, 31 and 32 interwoven with one another. As shown, yarn 32 includes distal ends extending from the layer 26. In operation, these tethered ends may provide for electrical or thermal contact between multilayered fabric 25 and an external ground or heat sink/source.

As shown, layer 27 comprises yarns 35 interwoven with yarns 37. Here, these yarns are woven to form a grid pattern. This grid or mesh-like pattern of layer 27 may act against impending ballistic elements. Alternatively, this fabric may in fact define woven electrical circuits.

Layer 28 includes an array of parallel yarns 39 positioned closely to one another. This array of tightly packed parallel yarns may define a physical nanoscale barrier against objects larger than or equal to $1 \times 10^{-9}$ meters.

Layers 27 and 28 may act cooperatively to filter material larger than or equal to $1 \times 10^{-9}$ meters. For example, layer 28 with the closely aligned parallel yarns provides a tear-resistant, anti-abrasion shield. One use of a multilayered fabric 25 may be to create lightweight garments impermeable to gas flow such as, for example, fabrics for spacesuits, chemical protective clothing, and biological protective clothing.

Figure 4:
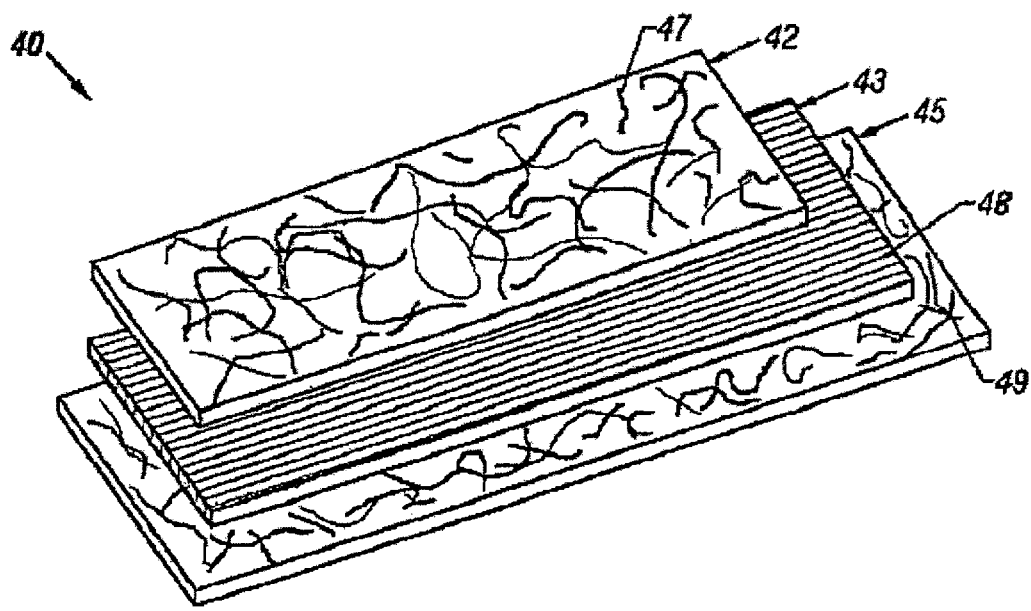
FIG. 4 provides another layered fabric structure having layers formed of fabric woven comprising carbon nanotubes.

FIG. 4 (woven and non-woven) depicts yet another multilayered fabric 40. Here, fabric 40 includes individual fabric layers 42, 43 and 45. As depicted, layer 42 includes carbon nanotube fibers 47 arranged in a substantially random manner. Operatively, layer 42 may exhibit electrically insulating characteristics. Layer 43 as depicted includes an array of fibers 48 arranged in parallel with one another. This structure may promote electrical or thermal conductivity therethrough. Similar to layer 42, layer 45 comprises randomly arranged yarns 49 to provide electrical or thermal insulation.

Multilayered fabric 40 may be used to construct a Faraday cage that uniformly distributes charge about the outer surface while leaving an interior surface as a field free region. Layer 43 provides a conductive or highly conductive layer insulated by layer 45, which prevents the wearer from contacting conducting layer 43. Additionally, inner layers of nanotube fabric can be applied to provide the wearer additional comfort, such as lining for warmth or wicking material to draw moisture away from the wearer's skin.

A garment constructed from multilayer fabric 40 may be resistant to tearing due to the high mechanical strength and stain resistance provided by carbon nanotubes, lightweight (i.e., less bulky due to the size and strength provided by the carbon nanotubes), and electrically isolated by layer 43, which draws current away from the wearer.

Such a multilayered fabric would have many applications. For example, an electrical lineman may require protective clothing of carbon nanotube fabric to draw current away. An astronaut or a deep-sea diver may require fabrics that protect against abrasion, impacting ballasting elements, electromagnetic radiation, and/or thermal protection via reflection or conduction.

Figure 5A:
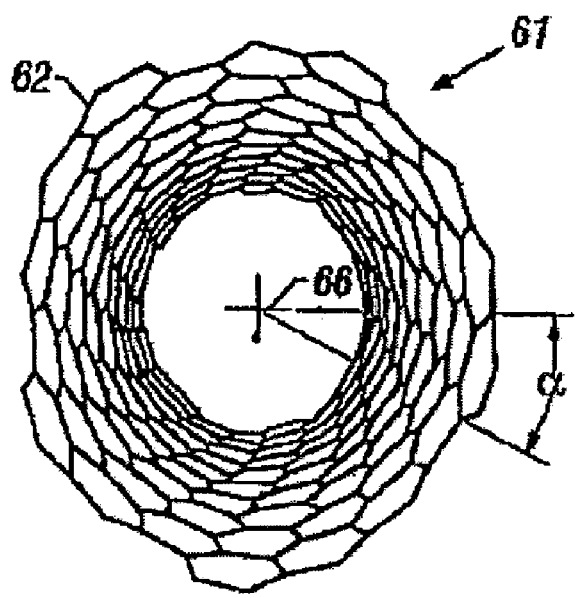
FIGS. 5A, 5B and 5C illustrate various lattice structures of single walled carbon nanotubes that demonstrate differing electrical properties.
Figure 5B:
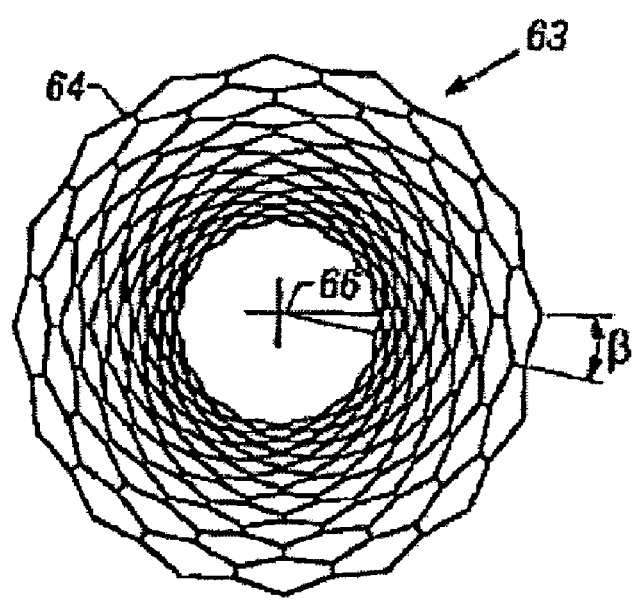
Figure 5C:
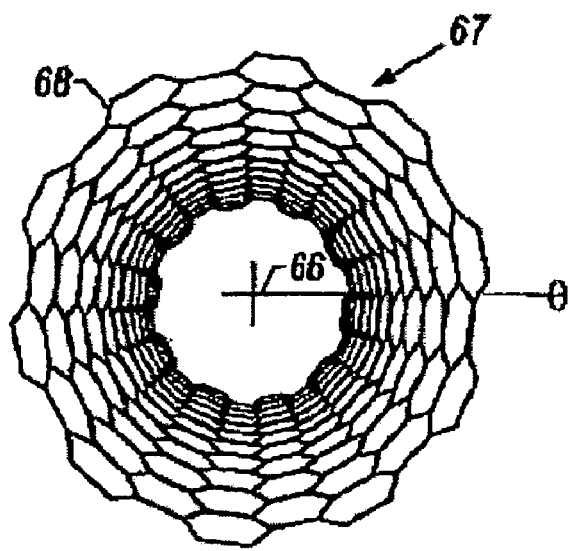

FIGS. 5A, 5B and 5C depict various lattice structures associated with single-walled carbon nanotubes used to form the fibers and yarns. Each carbon nanotube 61, 63 and 67 has a symmetrical axis 66 extending longitudinally along the centerline of each single-walled carbon nanotubes.

FIG. 5A depicts the lattice structure of an electrically insulating single-walled carbon nanotube. As such, yarns formed may include many insulating single-walled carbon nanotubes fibers. Insulating lattice structure 62 forms an angle alpha ($\alpha$) from symmetrical axis 66, wherein $\alpha$ is 30°. In this lattice structure, each insulating single walled carbon nanotube 61 inhibits the flow of electricity.

FIG. 5B illustrates the lattice structure of a semiconducting single-walled carbon nanotube 63. Yarns may also be formed from semiconducting single-walled carbon nanotubes fibers. The lattice structure of each semiconducting single-walled carbon nanotube 63 is oriented at an angle beta ($\beta$) from symmetrical axis 66, wherein $\beta$ is greater than 0° but less than 30°. This allows the structure 63 to form a chiral configuration. Here, each semiconducting single-walled carbon nanotube 63 inhibits that flow of electricity therethrough.

FIG. 5C depicts the lattice structure of a highly conductive single-walled carbon nanotube 67 used to form yarns or fibers that superconduct electricity. Lattice structure 68 aligns parallel to symmetrical axis 66. Varying the lattice structures of each single-walled carbon nanotube within a yarn changes that yarn's ability to conduct electricity therethrough. Depending on the application, the network of yarns may include any combination of insulating, semiconducting, and conducting single-walled carbon nanotubes. Furthermore, yarns may include nanotubes other than single-walled carbon nanotubes, such as, for example, multi-walled carbon nanotubes having similar mechanical and electrical characteristics.

Figure 6:
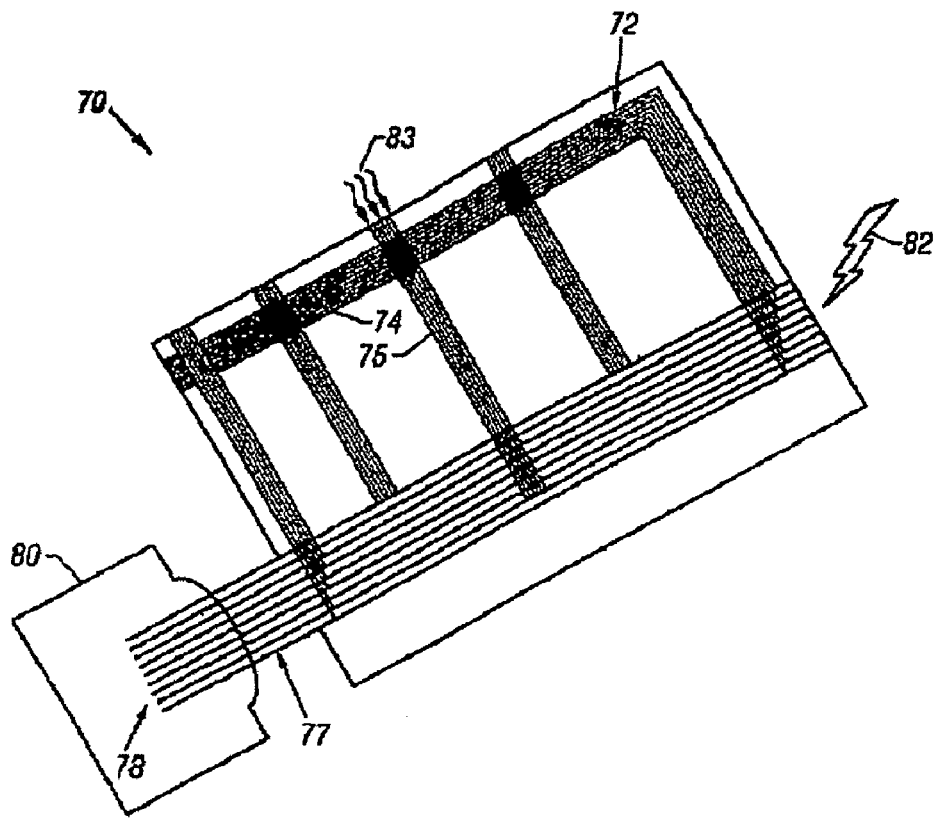
FIG. 6 illustrates a tethered piece of fabric.

FIG. 6 illustrates a tethered fabric 70 of woven yarns. Weave 72 further comprises a first yarn 74 and a second yarn 75 positioned perpendicularly from the first yarn 74. Yarn 74 or yarn 75 may include fibers formed of carbon nanotubes. Fabric 70 couples to an umbilical or tether 77 extending from weave 72 to distal end 78. Tether 77 couples on the opposite end to base 80 wherein base 80 serves as an electrical ground or thermal heat sink.

Tether 77 may couple to either the first or second yarns 74, 75 left unwoven and bundled into the umbilical. The umbilical or tether provides thermal as well as electrical grounding to provide protection from thermal or electrical hazards by connecting to a heat sink, or electrical hazards by connecting to ground.

Weave 72 provides a path to direct electricity toward and through the tether 77. Weave 72 may provide a highly conducting (low or no resistance) path for electricity and heat and thus no temperature gradient along tether 77 so long as energy is dissipated out through tether 77. Base 80 should have sufficient surface area and density to dissipate heat conducted throughout weave 72 to operatively provide a heat sink as well. Similar to the channeling of heat and/or electric energy through tether 77, those of ordinary skill in the art will readily recognize the channeling of other types of electromagnetic energy through tether 77 is possible as well. If the weave provides for continuous fiber direction, i.e., cross-fiber conduction to send energy from one end to another end of the fiber without loss and to thus dissipate energy through the umbilical. For example, energy within the range extending from the extra ultraviolet to the radio wave range.

FIG. 7 depicts a garment 90 made from such material. Umbilical 95 allows energy exerted on garment 90 to be dissipated. Accordingly, the suit is made from fabric 92 that comprises carbon nanotube fibers woven together.

Returning to FIG. 6, electrical energy 82 is applied to weave 72. Similarly, electrical energy is applied to garment 90 of FIG. 7. In both cases, this energy exits through the umbilical. Electromagnetic energy 83 in FIG. 6 flows through weave 72 and umbilical 78. In the same manner, light energy may be directed through fabric 92 having highly conducting nanotube fibers so that the electromagnetic energy flows through distal end 97 via base 98.

FIG. 8 depicts a garment that incorporates many unique properties of carbon nanotubes within its various layers. Garment 100 acts as a Faraday vest having outer layer 110 over intermediate layer 113, and inner layer 115. Outer layer 110 comprises conductive yarns 111 woven in a mesh-like manner. The mesh-like configuration provides the wearer with flexibility and strength against tearing as well as resistance to impacting ballistic objects or projectiles. In addition to providing strength and flexibility, yarns 111 electrically protect the wearer. Alternatively, yarns 111 may be woven to define electronic circuits.

Intermediate layer 113 is positioned below the outer layer 110 and may in fact be interwoven with outer layer 110. Intermediate layer 113 comprises yarns 114 aligned or woven parallel with one another and/or coplanar with one another. Accordingly, yarns 114 operatively provides strength and ductility against tearing, impacting ballistic elements and/or abrasives. Moreover, yarns 114 may further include highly conducting carbon nanotubes. Thus, yarns 114 may act to shunt energy associated with the electromagnetic spectrum, such as extreme ultraviolet, optical, or radio wave contact in addition to any electrical or magnetic contact.

Inner layer 115 lies beneath intermediate layer(s) 113. Inner layer 115 may also be interwoven with intermediate layer(s) 113. Inner layer 115 insulates a wearer of garment 100 from being in direct contact with conducting layer 113. As shown, inner layer 115 comprises yarns 116 randomly oriented within inner layer 115.

Inner layer 115 further includes compatible yarns 116 such as fibers of cotton, wool, and/or other like fabrics as known to those skilled in the art to provide warmth and comfort to the wearer. In one embodiment, yarns 116 include wicking fibers that draw moisture away from the wearer or sound absorbing fibers that muffle or eliminate sounds generated by and/or received by the wearer. In another embodiment, yarns 116 provide a spring-like configuration so as to dampen or absorb shock forces exerted on the Faraday vest 100. As such, the network of yarns protects the wearer from forces applied thereto.

Electrically, a Faraday vest functions as a Faraday cage in which electromagnetic radiation does not penetrate the highly electrically conductive surface. Alternatively, garment 100 may act to conduct and direct current through an intermediate layer while still protecting the wearer via insulation. Moreover, the strength provided by the carbon nanotube fibers enables garment 100 to provide lightweight protection to the wearer from projectiles.

Colored yarns or fibers may be included in the fabric to enhance the fabric's appearance. For example, yarns may include colors suitable for camouflage, quick identification and/or reflection, and merchandising purposes.

FIG. 8B depicts a multilayered glove 120. Glove 120 includes an outer layer 121, at least one intermediate layer 122, and an inner layer 123. Glove 120 forms a Faraday cage having at least one intermediate layer 122 that electrically insulates the wearer. In another embodiment, glove 120 comprises layers highly resistant to tear or abrasion. One such use would be for a surgical glove that resists accidental cuts and acts as a biological barrier to bacteria or viruses.

Glove 120 may comprise layers of carbon nanotube fibers integrated with one another. For example, outer layer 121 may include a palm portion comprising electrical circuits 124 wherein the circuitry includes memory and/or sensory devices or other like devices as known to those skilled in the art.

Outer layer 121 includes several fabrics that define the finger portions of a glove. The thumb and index finger may include a meshlike fabric having tightly interwoven yarns. As such, the thumb and index finger may provide enhanced strength and resistance to wear, among other aspects. Additionally, the finger portions of glove 120 may define memory and/or sensory circuits. Other garments such as stockings, coats, shirts, suits, and/or hats may take advantage of the properties offered by the various layers of such fabric. For example, stockings (pantyhose) made from carbon nanotube yarns would exhibit high resistance to tearing and running.

Figure 9:
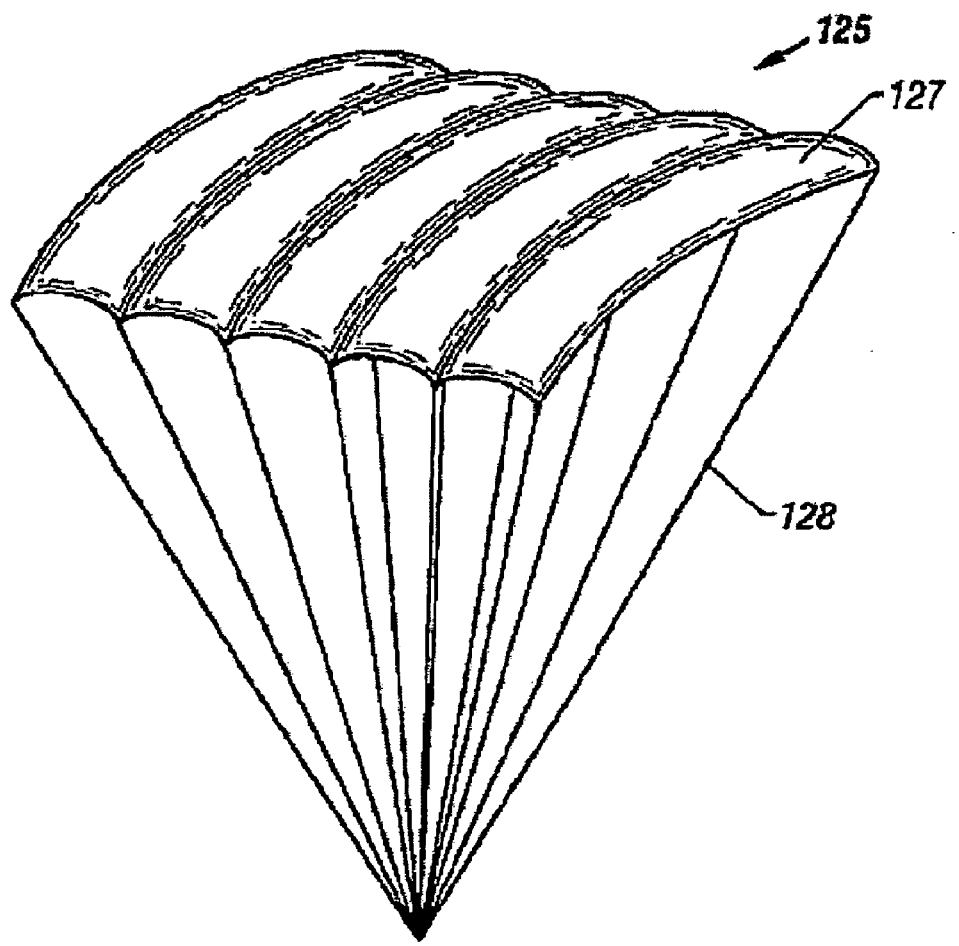
FIG. 9 depicts a parachute made from sailcloth woven from or reinforced by carbon nanotubes.

FIG. 9 depicts other uses for fabric containing carbon nanotubes. Similarly, such fabric may be applied to sailcloth for use on boats, blimps, parachutes, tents, gliders, windmills, and other like applications as known to those skilled in the art.

FIG. 9 specifically depicts that fabric 122 be configured as a parachute. Additionally, yarns of carbon nanotubes may be braided into strong yet lightweight cords or ropes 128.

Figure 10A:
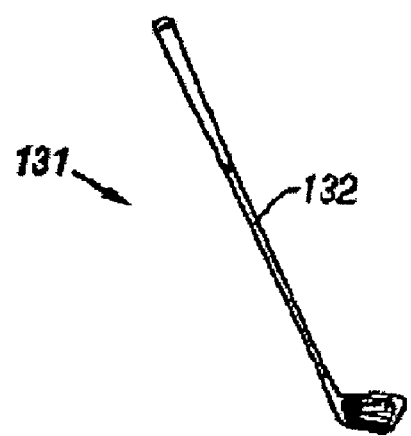
FIGS. 10A, 10B and 10C illustrate high strength sports equipment that include carbon additive fibers.
Figure 10B:
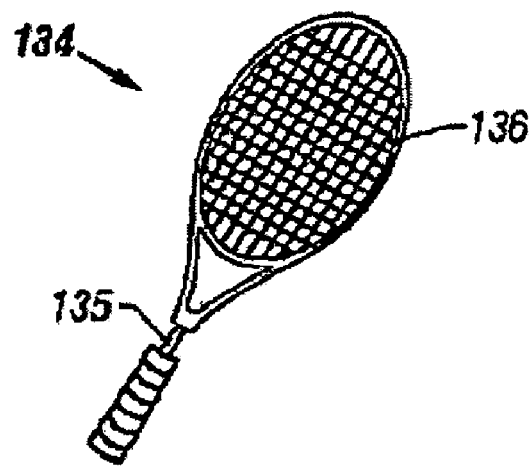
Figure 10C:
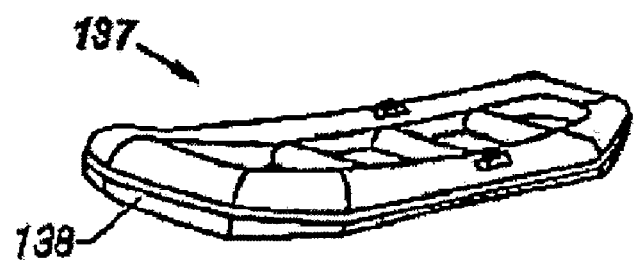

FIGS. 10A, 10B and 10C depict additional applications fabrics woven from for yarns comprising carbon nanotube fibers. FIG. 10A depicts a golf club made of such materials. Similarly, FIGS. 10B and 10C depict a sports racquet and inflatable boat, respectively. It should be noted that the fabric formed from these fibers need not be limited to two-dimensional fabrics. Rather, three dimensional woven structures, as known to those skilled in the art, provide a limitless number of applications. Other applications include sleeping bags, bicycle parts and equipment, skis, snowboards, body panels for cars, boats, planes, snowmobiles, fishing rods, home exercise equipment, wetsuits, hunting equipment, in-line skates and roller skates, diving equipment, skateboards, and other like applications.

Figure 11:
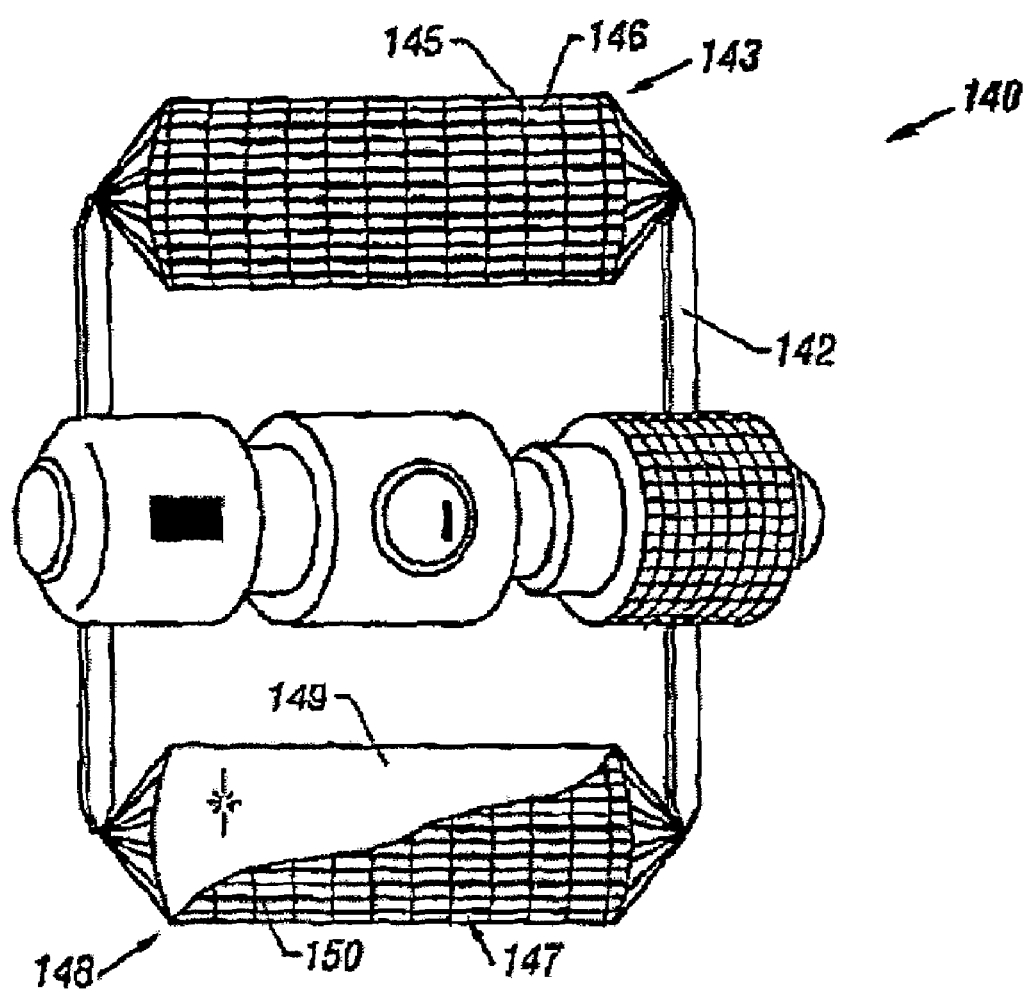
FIG. 11 depicts that these fabrics may be incorporated into a satellite structure.

FIG. 11 depicts a three dimensional orbital structure 140. Structure 140 includes frame 142 wherein frame 142 supports a first structure arrangement 143 and a second structure arrangement 148. The fabric provided by the present invention may act as a collector for receiving solar and/or electromagnetic energy or a shield for projectiles or electromagnetic radiation.

In particular, first structure arrangement 143 includes fabric 145 formed from carbon nanotube fibers. Fabric 145 includes companion yarns 146 cooperatively coupled to carbon nanotube fibers. Companion yarns 146 may include reflective fibers that reflect and direct light incident on fabric 145 to generate electricity. Fabric 145 also provides a thin, lightweight, tear-resistant, strong foundation for the collection of thermal energy. Fabric based on carbon nanotube fibers is highly desirable for sending a payload into space and extending the payload's operation life in space. Structure 148 shows a partially cutaway view so as to reveal a fabric 147.

In summary, the present invention provides fabrics that have unique chemical, electrical, and thermal properties. The fabrics comprise layers of yarns woven together wherein the yarns further comprise carbon nanotube fibers. These carbon nanotube fibers may be either single-walled or multi-walled carbon nanotubes. The use of carbon nanotube fibers allows the fabrics to insulate, semi-conduct or super-conduct electrical charges. Additionally, the thermal properties of carbon nanotubes allow thermal energy to flow efficiently between the fabric and a heat sink or source. Additional yarns of materials other than carbon nanotubes can be integrated or woven into the fabric to provide other unique properties for the fabric. These fabrics can be layered to form unique garments or structures.

Although the present invention has been described in detail, it should be understood that various changes, substitutions, and alterations can be made hereto without disporting from the spirit and scope of the invention as defined by the appended claims.

What is claimed is:

1. A garment made of fabric, wherein said fabric comprises:
   a first layer of yarns woven to form the fabric wherein said yarns comprise at least one carbon nanotube fiber and wherein said carbon nanotube fiber comprise single-walled carbon nanotubes and/or multi-walled carbon nanotubes; and
   at least one additional layer of yarns woven together, wherein said first layer comprises yarns of superconductive carbon nanotube fibers that form a Faraday cage and wherein said at least one additional layer of yarns woven together comprise insulating carbon nanotube fibers.

2. The garment of claim 1, wherein said carbon nanotube fibers comprise insulating, semiconducting, conducting and/or superconductive carbon nanotubes.

3. The garment of claim 1, wherein said yarns comprise at least one fiber selected from the group consisting of wool, cotton, asbestos, nylon, synthetic and carbon nanotubes and wherein said carbon nanotube comprise insulating, semiconducting, conducting and/or superconductive carbon nanotubes.

4. The garment of claim 1, wherein said first layer of yarns woven together exhibit the physical, electrical, mechanical, chemical or thermal properties of said at least one carbon nanotube fibers that comprise said yarns.

5. The garment of claim 1, further comprising a tether electrically coupled to said first layer and wherein said tether shunts electricity flowing within said first layer to ground.

6. The garment of claim 1, wherein said first layer comprises yarns of carbon nanotube fibers having a high thermal conductivity and wherein said at least one additional layer of yarns thermally insulate said first layer from a wearer.

7. The garment of claim 6, further comprising a tether thermally coupled to said first layer and wherein said tether shunts thermal energy between said first layer and a heat-sink or heat-source.

8. The garment of claim 1, wherein said garment comprises a glove, body suit or stockings.

9. The garment of claim 1, wherein said first layer comprises tightly packed carbon nanotube fibers held together by Van der Walls' forces.

10. The garment of claim 9, wherein said garment acts as barrier to objects larger than or equal to $1 \times 10-9$ meters.

* * * * *